Dec. 22, 1931.  H. R. CLARKE  1,838,027
ELECTRODYNAMIC DEVICE
Filed March 11, 1930   2 Sheets-Sheet 1
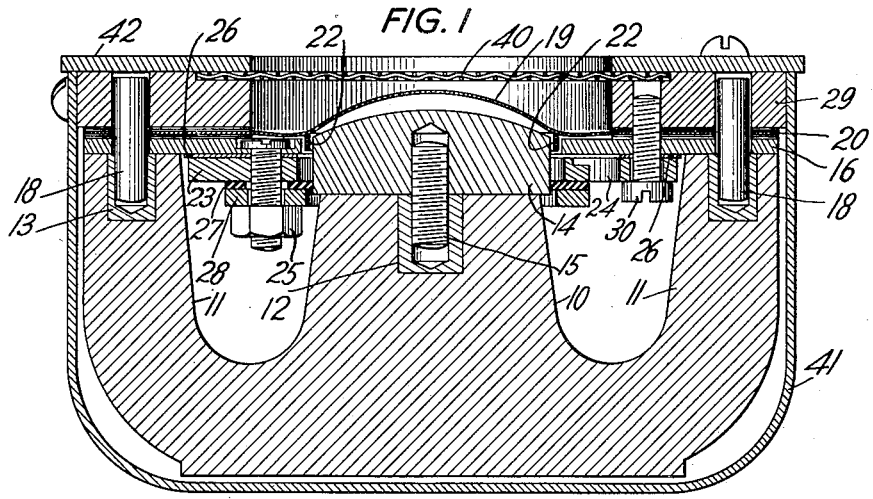
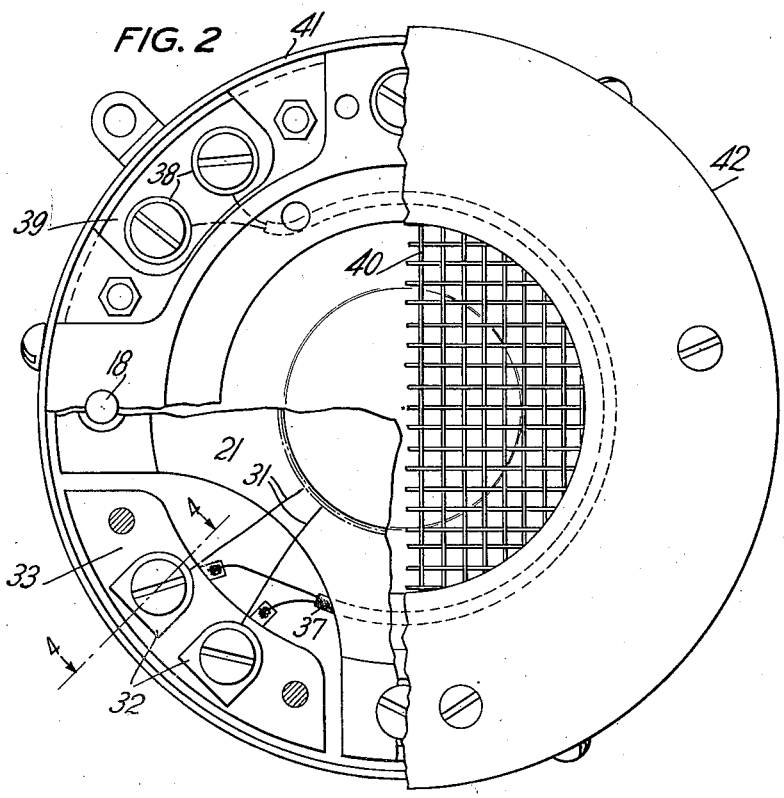
INVENTOR
H. R. CLARKE
BY
Walter C. Kiesel
ATTORNEY Dec. 22, 1931. H. R. CLARKE 1,838,027
ELECTRODYNAMIC DEVICE
Filed March 11, 1930 2 Sheets-Sheet 2
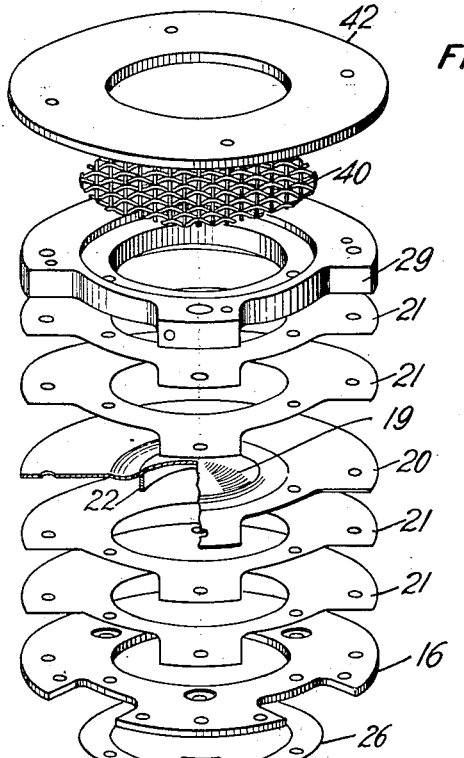
FIG. 3
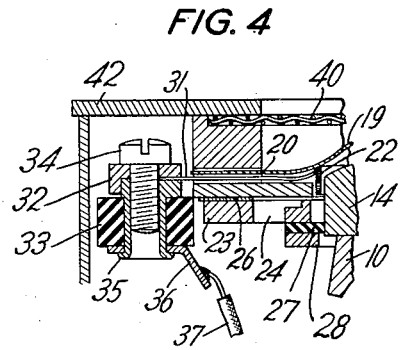
FIG. 4
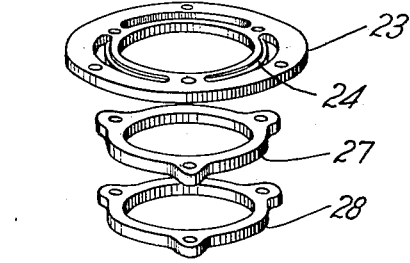
FIG. 5
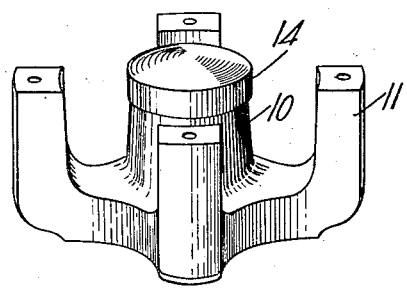
INVENTOR
H. R. CLARKE
BY
Walter C. Kiesel
ATTORNEY Patented Dec. 22, 1931

1,838,027

UNITED STATES PATENT OFFICE

HARRY R. CLARKE, OF NEWARK, NEW JERSEY, ASSIGNOR TO BELL TELEPHONE LABORATORIES, INCORPORATED, OF NEW YORK, N. Y., A CORPORATION OF NEW YORK

ELECTRODYNAMIC DEVICE

Application filed March 11, 1930. Serial No. 434,994.

This invention relates to electro-dynamic devices and more particularly to such devices used in receiving and transmitting sound.

An object of the invention is to improve the efficiency and transmission requirements of speech transmission instruments, such as telephone receivers and transmitters.

Another object is to maintain accurately close limits between the pole pieces and the movable coil of a transmitter or receiver of the watch-case type.

In accordance with one embodiment of this invention, an electro-dynamic device comprises a permanent magnet, having a central pole and an outer pole which may be cup-shaped or have four equally disposed upturned legs, and is provided with an annular plate pole piece attached to the outer pole of the magnet. The annular pole piece is arranged coaxial with the central pole piece by removable pins to form the annular air-gap between the plate pole piece and the center pole piece. A diaphragm having a cylindrical coil attached thereto is mounted on the annular pole piece and the coil is accurately centered in the air-gap between the pole pieces by viewing through the openings formed by the periphery of the center pole and the damping plate. This arrangement insures accurate concentricity between the pole pieces and the cylindrical coil and insures the maintenance of very close limits between the associated elements.

A chamber is provided between the diaphragm and an apertured plate to create a damping effect, by means of air, upon the mechanical motion of the diaphragm. The resistance of the air damping is increased if the air is led through a circuitous and restricted path instead of a direct path. In accordance with this invention the opening between the center pole and the damping plate is closed by a sealing member of resilient material so that the air under the diaphragm is led out through the air-gap between the pole pieces and is driven at an angle to a restricted opening between the annular pole piece and the damping plate and finally enters the casing through elongated slots in the damping plate. No air can travel through the direct path in the line of the annular air-gap since the resilient ring seals the gap between the center pole and damping plate.

A feature of the invention relates to bringing out the leads in a straight line from the cylindrical coil on the diaphragm to the terminals, to prevent bending of the leads and consequent breakage due to crystallization at the bends. This is accomplished by mounting the terminals on an insulating block set in the annular pole piece so that the connections between the coil and the terminals are in a single plane. This arrangement materially reduces the length of the leads and overcomes bending.

The construction and features of the invention will be more fully understood from the following detailed description with reference to the accompanying drawings in which Fig. 1 is an enlarged view in cross-section of an electro-dynamic device embodying the sealing feature in accordance with this invention;

Fig. 2 is a plan view of the device shown in Fig. 1 with a portion cut away to show the relation of the parts and the arrangement of the leads from the coil to the terminal block;

Fig. 3 is an exploded perspective view showing the various elements of the device and their position with respect to one another;

Fig. 4 is an enlarged detail view of a section of the device to illustrate the manner in which the leads for the coil are brought out to the terminals and also to show the restricted air passageway for damping the diaphragm in accordance with this invention, and Fig. 5 is a fragmentary view in cross-section showing the method of accurately determining the axial relation of the pole pieces of the device in accordance with this invention.

Referring to the drawings an electro-dynamic device, such as a transmitter, is shown and comprises a permanent magnet, preferably of a cobalt alloy which may have the proportions of 35% cobalt and 65% iron, having a central pole 10 and four equally disposed upturned legs 11. Cobalt alloys of the composition specified above are very hard and difficulty is experienced in drilling the magnet and providing tapped portions thereon. Accordingly the central pole 10 and the upturned legs 11 are provided with cast inserts 12 and 13, respectively, of material such as soft iron, which may be readily drilled and tapped. A circular dome-shaped pole piece 14, which may be of iron, having an accurately machined periphery, is securely attached to the central pole 10 by a stud 15 threaded therein and extending into the insert 12.

In order to obtain desirable and accurate operating characteristics over the whole speech frequency range, it is essential that the width of the circular air-gap between the pole pieces be absolutely uniform. The preferred method of assembly of the device to insure this result is to place an apertured plate member or annular pole piece 16 of the same magnetizable material as the pole piece 14, upon the upturned legs 11 of the magnet, as shown in Fig. 5, with an accurately machined cylindrical gauge 17 interposed between the pole pieces 14 and 16. The pole piece 16 is then drilled together with the cast inserts 13 and the holes in the pole piece 16 reamed to a diameter slightly greater than that of the drilled holes in the inserts. Dowel pins 18 which make a sliding fit with the reamed apertures in the annular pole piece 16 are forced into the drilled inserts and the gauge 17 is removed. In this manner a uniform gap is obtained between the concentric circular adjacent edges of the pole pieces 14 and 16 and the annular plate may be removed if necessary as, for instance, when the diaphragm and coil are attached thereto, and replaced in exactly the same position.

A light metallic diaphragm, preferably an aluminum alloy, having a central dome-shaped portion 19 and a substantially flat annular portion 20 having therein a plurality of oversized apertures to allow the passage of the dowel pins 18, is carried upon the annular pole piece 16 with a number of insulating washers 21, preferably of some fibrous material, such as paper, on both sides of the annular portion 20 of the diaphragm. A cylindrical coil 22 which may be of the type shown in U. S. Patent 1,707,544, April 2, 1929, to A. L. Thuras, is rigidly attached to the edge of the dome portion 19 of the diaphragm. A damping plate 23 having a central opening greater in diameter than the inner diameter of the pole piece 16 and provided with a plurality of elongated slots 24 is attached by bolts 25 to the annular pole piece 16 together with a spacing member or shim 26. The shim has a rim portion equal in width to the distance between the outer edge of the slots 24 in the damping plate 23 and the peripheral edge thereof so that a restricted connecting passageway is established between the chamber under the dome portion 19 of the diaphragm and the elongated slots 24 in the damping plate 23.

In order to seal the passageway occasioned by the central aperture in the damping ring 23 and thereby prevent the escape of any air from under the dome-shaped portion 19 of the diaphragm in any way except through the circuitous path from the chamber through the restricted opening between the pole piece 16 and damping plate 23 provided by the shim 26 and the elongated slots 24 in the damping plate 23, a sealing member 27 of rubber, or similar resilient or insulating material, is attached to the damping ring 23 together with a metal guard 28 by the bolts 25. This construction results in a material increase in the damping effect of the air under the dome-shaped portion 19 of the diaphragm and thereby improves the operating characteristics of the device.

In order to obtain faithful and uniform reproduction over the whole speech frequency range with devices of the type shown it is desirable that the coil 22 be accurately positioned in the air-gap between the pole pieces 14 and 16. This is accomplished in accordance with one feature of this invention by employing the following procedure of assembly. The shim 26 and damping plate 23 are attached to one side of the annular pole piece 16 and the assembly is slipped into place over the dowel pins 18. The diaphragm 20 is placed upon but not attached to the other side of the pole piece 16 with the coil 22 in the air-gap between the pole pieces 14 and 16. The position of the coil 22 is viewed through a microscope from the rear of the magnet, that is, though the gap between the pole piece 16 and the damping plate 23, and adjusted concentrically with respect to both the pole pieces 14 and 16. The diaphragm is then fixed in position by the clamping plate 29 to which the damping plate 23 is held by the bolts 30. The annular pole piece assembly is then removed from the legs 11 of the permanent magnet and the sealing ring 27 and guard ring 28 put in place and fixed in position by the bolts 25. The assembly is then again slipped into place over the dowel pins 18, the sealing ring 27 closing the gap through which the coil 22 is viewed.

The conductors 31 for the coil 22 are flat ribbon continuations of the coil 22 and are thin and fragile and hence require careful handling. In accordance with a feature of this invention and as shown in Fig. 4, bending of the conductors and excessive wear due to crystallization are eliminated by bringing the conductors 31 out between the paper washers 21. The ends of the conductors are clamped in terminal posts 32 which are attached to a block 33, of insulating material, by a bolt 34 threaded to a metallic sleeve 35 passing through the insulating block and having a flanged portion which supports a terminal lug 36. The terminal posts 32 are so positioned that the opening between the top and bottom portions thereof is in the same plane with the conductors 31 extending out between the washers 21. A pair of flexible insulated wires 37 extend from lugs 36 to terminal posts 38 mounted on an insulating block 39 which is provided with screws for securing conductor cords exterior to the casing.

The clamping plate 29 which has a central opening somewhat greater in diameter than the dome portion of a diaphragm is provided in its upper face with a recessed portion which accommodates a protective screen 40 allowing free passage of the sound waves to the diaphragm but preventing damage of the diaphragm by tampering therewith from the exterior. The entire unit is mounted within a casing of non-magnetic material which comprises a cup-shaped portion 41 and a top plate 42 attached thereto.

Although the description applies to a specific structure such as a transmitter or receiver it is to be understood that the construction may also be used in other electrodynamic or electromagnetic devices. Furthermore various modifications may be made other than as specifically shown and described without departing from the scope of this invention as defined in the appended claims.

What is claimed is:

1. An electro-dynamic device comprising a magnet having its pole pieces arranged to form a relatively small air-gap therebetween, a diaphragm, a coil attached to the diaphragm and suspended in said air-gap, a ring member attached to one of said pole pieces and spaced from the other pole piece, and means carried by said ring member for sealing the gap between one of said pole pieces and said ring member.

2. An acoustic device comprising a magnet having concentric inner and outer pole pieces, a diaphragm having its rim portion mounted on the outer pole piece of said magnet and its center portion in spaced relation to the inner pole piece of said magnet to form an air chamber therebetween, means for increasing the damping effect of the air in said chamber comprising an annular member disposed about but spaced from said inner pole piece and having a plurality of elongated slots therein in restricted communication with said air chamber, and resilient non-conducting means fixed to said annular member and engaging said inner pole piece for confining the passage of the air from said chamber to said slots.

3. An electro-dynamic device comprising a magnet, a diaphragm, an annular coil attached to said diaphragm and suspended in the air-gap between the pole pieces of said magnet, and means forming a restricted air chamber under said diaphragm consisting of a ring member out of contact with one pole piece of said magnet and mounted on the other pole piece and having a plurality of elongated slots therein, and means secured to said ring member for sealing the gap between said ring member and said first mentioned pole piece.

4. An electro-dynamic device comprising a magnet, a diaphragm, an annular coil attached to said diaphragm and suspended in the air-gap between the pole pieces of said magnet, and means forming a restricted air chamber under said diaphragm consisting of a ring member out of contact with one pole piece of said magnet and extending from the other pole piece and having a plurality of elongated slots therein, and a resilient member sealing the gap between said ring and said first mentioned pole piece.

5. An electro-dynamic device comprising a magnet, a diaphragm, an annular coil attached to said diaphragm and suspended in an air-gap between the pole pieces of said magnet, and means forming a restricted air chamber under said diaphragm consisting of a ring member carried by one pole piece of said magnet and spaced from the other pole piece so as to leave an air gap between the inner surface of said ring member and the outer surface of said other pole piece, and a rubber ring sealing said gap.

6. An electro-dynamic device comprising a magnet, a diaphragm, an annular coil attached to said diaphragm and suspended in the air-gap between the pole pieces of said magnet, and means forming a restricted air chamber under said diaphragm consisting of a ring member out of contact with one pole piece of said magnet and mounted from the other pole piece, and having a plurality of slots therein, and a resilient insulating ring sealing the gap between said ring member and said first mentioned pole piece.

7. A unitary structure for an electro-dynamic device comprising an annular pole piece, a diaphragm attached to said pole piece, a cylindrical coil carried by said diaphragm and movable with respect to said pole piece, an insulating block carried by said pole piece having its upper surface in substantially the same plane as one edge of said coil, terminals on said block each having an opening substantially in alignment with the edge of the diaphragm, and straight connectors from said coil adjacent said diaphragm and clamped in said terminals.

8. In an acoustic device a magnet having concentric inner and outer pole pieces, and a flexible ring carried by said outer pole piece and engaging said inner pole piece.

9. In the assembly of an electro-dynamic device comprising a magnet having a center pole piece and an annular pole piece concentric therewith, a damping plate and a diaphragm carrying a coil, the method of centering the coil in the air-gap between the pole pieces which comprises attaching the damping plate to the annular pole piece, positioning the damping plate around the center pole piece of the magnet to form the air-gap between the pole pieces, placing the diaphragm on the annular pole piece with the coil in the air-gap, viewing the coil through the aperture between the center pole piece and the damping plate, and adjusting the diaphragm to concentrically position said coil with respect to the adjacent surfaces of said pole pieces.

10. In the assembly of an electro-dynamic device comprising a magnet having a center pole piece and an annular pole piece concentric therewith, a damping plate, and a diaphragm carrying a coil, the method of centering the coil in the air-gap between the pole pieces which comprises attaching the damping plate to the annular pole piece, positioning the damping plate around the center pole piece of the magnet to form the air-gap between the pole pieces, placing the diaphragm on the annular pole piece with the coil in the air-gap, viewing the coil through the aperture between the center pole piece and the damping plate, adjusting the diaphragm to concentrically position said coil with respect to the adjacent surfaces of said pole pieces, and sealing the opening through which the view is taken.

11. In combination, a diaphragm, a coil attached thereto, a metallic member on each side of said diaphragm for clamping it and holding it in fixed position, a pair of insulating washers on one side of said diaphragm, and metallic leading-in conductors for said coil between said washers and held in place by said metallic members.

In witness whereof, I hereunto subscribe my name this 7th day of March, 1930.

HARRY R. CLARKE.